No. 853,228. PATENTED MAY 14, 1907.
R. DALMER.
VEHICLE WHEEL AND PNEUMATIC TIRE FOR SAME.
APPLICATION FILED DEC. 27, 1905.

2 SHEETS—SHEET 1.

WITNESSES
W. P. Burke
John A. Percival

INVENTOR
Robert Dalmer
BY Richardson
ATTYS

UNITED STATES PATENT OFFICE.

ROBERT DALMER, OF LONDON, ENGLAND.

VEHICLE-WHEEL AND PNEUMATIC TIRE FOR SAME.

No. 853,228.　　　Specification of Letters Patent.　　　Patented May 14, 1907.

Application filed December 27, 1905. Serial No. 293,495.

*To all whom it may concern:*

Be it known that I, ROBERT DALMER, a subject of the Emperor of Austria, residing at London, England, have invented new and useful Improvements in Vehicle-Wheels and in Pneumatic Tires for Same, of which the following is a specification.

This invention has for its object the construction of a pneumatic tired wheel for use on motor cars, bicycles or other vehicles, in such a way as to make it practically impossible for the inflated inner tube to become punctured or injured in any way. If however through some unforeseen cause the inner tube should become unfit for use, I provide a simple automatic device to enable the car to proceed on its journey on the solid outer tire without the necessity of having to effect troublesome tire repairs on the road. This outer tire is further constructed in such a way, that the danger of side slip is reduced to a minimum.

In order that this invention may be readily understood, I will now proceed to describe a convenient design of tire, without of course limiting the invention to details of construction which would admit of reasonable modification within the scope of the invention.

Figure 1:
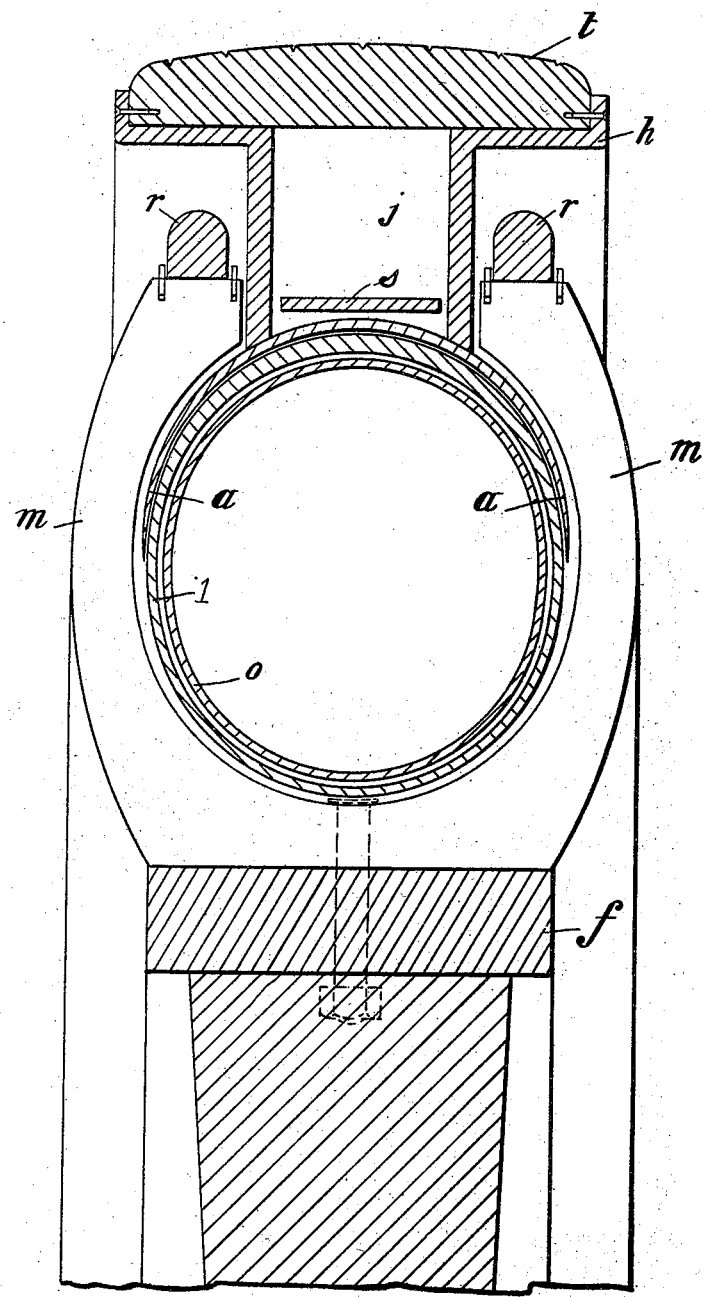
Figure 2:
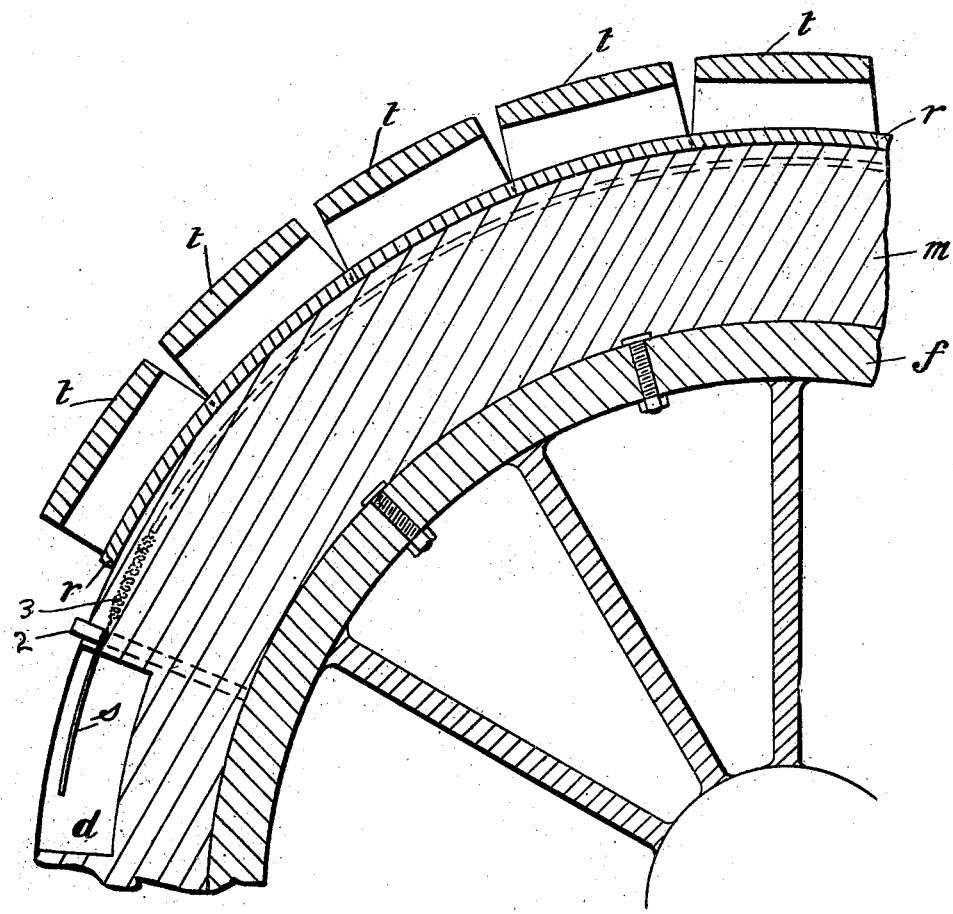

Figure 1 is a cross section of a motor wheel and pneumatic tire. Fig. 2 is a part sectional side view of the same.

In the felly $f$ of a motor or other wheel, I fix by means of screws and nuts or other well known means a metal box $m$, preferably made of steel so that it rests firmly on all points against the rim of the wheel. In the opposite face of the box or case, I provide a circumferential gap or slot of a suitable width and depth, while the interior of the box or case is constructed in such a way, that a clear passage of a suitable form is left, presenting in cross section an ellipse, a circle or other suitable shape, with one segment cut out, formed by the gap or slot above described. In this passage, I put my inner inflated rubber tube, thus protecting it from all injury. On each side of the circumferential slot or gap, I fix by means of beads or studs screwed into the metal box at suitable intervals, or by other equivalent means, two rubber strips $r$ of a semicircular or other suitable cross section, and being fixed parallel to each other. The inflated inner tube $o$ contained in the passage of the metal box above described is constructed like a length of hose of suitable diameter with both ends sealed up air tight by means of flexible caps instead of the ordinary endless circular tube as now used. In order to protect this rubber tube against dirt and grit, and also so as to strengthen it, I incase it in leather, canvas or other suitable substance, which may be impregnated with graphite or other suitable preparation, so as to lessen friction and to make it impervious to water. The outer tire which comes into contact with the road, I construct of steel or other metal, wood or rubber, or other suitable material.

In order not to impair the resilience of the tire, and to get the utmost effect of the compressed air in the inflated inner tube, which acts like a spring, I construct my solid outer tire in sections. Each section of the outer tire consists of the tread $t$, the tread-holder $h$, the hollow neck $j$ and the flanges $a$. Preferably I construct the neck and the tread-holder in one piece, the said holder meeting the neck at right angles, while I provide at the inner ends of the neck, strips projecting at a suitable angle to which the flanges $a$ can be welded, or screwed, or fixed by some other well known method. The tread $t$, I construct in steel, or other metal, wood or rubber. If metal or wood is used, the tread is fixed in the holder $h$ by a suitable number of screws, or I may use bolts, fitting into holes in the holder and penetrating the width of the tread, each bolt being provided at one end with a flat head or other stop, and at the other end with a screw and nut which I may secure with a pin, or other well known method. In order to prevent the danger of side slip, I may corrugate the tread, in case I use metal, and if wood is used, vertical strips of steel can be hammered or otherwise fixed in the tread. If solid rubber is used, I provide the holder with flanges or ribs of well known design, in order to grip and hold in position the pieces of rubber. The flanges $a$ are of such a construction that they adjust themselves to the inner wall of the metal box $m$ above described. I construct these flanges preferably of spring steel, so that they regain their original shape when they are released after being pressed together. I may further use thin layers of spring steel, so as to form a laminated spring of well known design in constructing these flanges. In the metal box $m$ I provide a door $D$ of sufficient width, so as to allow of the easy removal of the sections of the outer tire and of the inner rubber tube. Right across, and closing the passage of the metal box, so as to be easily accessible through the door above described, I firmly fix a metal plate 2, in order to arrest the creeping back of the sections of the outer tire. This door can be securely bolted down when the wheel is in use.

The sections of the outer tire are held together by means of a flexible steel band $s$ threaded through their hollow necks. This steel band is fixed to the metal plate 2 above described by means of a spiral spring 3. I provide this steel band, so as to prevent dirt and grit working through the cracks between the sections of the outer tire; a further function of this steel band and spring will be hereinafter explained.

I have now described the different elements of my tire and will proceed to explain the action when the inner tube is inflated, and secondly when the inner tube is not in use. The neck of the sections composing the outer tire fits loosely into the circumferential slot or gap above described, and is long enough to allow of a sufficient movement up and down, while the flanges $a$ are of such a shape that they adjust themselves readily to the inner wall of the metal box. It will be seen that by inflating the inner tube, these flanges will be tightly pressed against the inner wall of the metal box, thus securely fixing the sections, composing the outer tire, in position, while still admitting of the up and down movement caused by the unevenness of the road. The resilience of the inflated inner tube is thus instantly transmitted to the sections forming the outer tire. The two rubber strips $r$ fixed on each side of the circumferential slot or gap are provided to absorb all specially hard knocks or bumps, the wheel may receive, which knocks are further lessened by the wings of the flanges becoming compressed and acting as a spring. This point is of special importance when great weights have to be supported.

I now proceed to describe the action of my tire when the inner tube is not operative. The sections of the outer tire $t$ joined together by the steel band $s$ which is fixed by means of a spring to a hook or similar contrivance on the metal plate closing the passage of the metal box as above described. The inflated inner tube being thrown out of action, this spring becomes now operative, pulling the sections composing the outer tire inward, until the tread holder of the outer tire rests on the rubber strips $r$; the flanges $a$ must be so constructed that their ends then reach the widest diameter of the passage of the metal box, so that any further movement would compress the wings of the flanges which are constructed as a spring as above described. The tire derives now its resilience from the springs forming the flanges $a$ and the rubber strips fixed on each side of the circumferential slot or gap.

Having now described my said invention, I declare that what I claim and desire to secure by Letters Patent is:—

1. The combination with a wheel, of a metal box secured to the felly thereof, said box having a circumferential slot and its interior side walls being of arc shape, a tire consisting of a tread portion and a vertical portion extending into the circumferential slot and outwardly and downwardly curved flanges made of springy metal connected to said vertical portion and engaging with the arc shaped sides of the box said flanges forming a semicircle.

2. The combination with a wheel, of a metal box secured to the felly thereof, said box having a circumferential slot and its interior side walls being of arc shape, an outer tire made up of sections, each section consisting of a tread portion, and a vertical hollow portion extending into the circumferential slot, and outwardly and downwardly curved metal flanges on said vertical portion engaging with the arc shaped side walls of the box and the pneumatic tire in said box said flanges forming a semicircle.

3. The combination with a wheel, of a metal box secured to the felly thereof, said box having a circumferential slot, an outer tire composed of sections, each section comprising a tread portion and a hollow vertical portion extending into the box, a pneumatic tire in the box, a steel band passing through the hollow vertical portions and a spring connecting said band to a part of the box.

4. The combination with a wheel, of a metal box secured to the felly thereof said box having a circumferential slot and its interior side walls being of arc shape an outer tire composed of sections, each section comprising a tread portion and a hollow vertical portion extending into the circumferential slot and downwardly and outwardly curved flanges connected to said vertical portion and engaging with the arc shaped sides of the box, a pneumatic tire in the box, and a steel band passing through the hollow vertical portions.

In testimony whereof I have signed my name to this specification in the presence of two subscribing witnesses.

ROBERT DALMER.

Witnesses:
RICHARD A. HOFFMANN,
CHARLES CARTER.